US012603855B2

(12) United States Patent
Young

(10) Patent No.: US 12,603,855 B2
(45) Date of Patent: *Apr. 14, 2026

(54) APPARATUS, SYSTEM AND METHODS FOR MANAGING PRIVATE CONTENT DELIVERY IN ASSOCIATION WITH A SHIPMENT

(71) Applicant: Antonio D. Young, Naperville, IL (US)

(72) Inventor: Antonio D. Young, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,226

(22) Filed: Nov. 14, 2023

(65) Prior Publication Data

US 2024/0080290 A1      Mar. 7, 2024

Related U.S. Application Data

(63) Continuation of application No. 17/866,266, filed on Jul. 15, 2022, now Pat. No. 11,818,085.

(51) Int. Cl.
| | |
|---|---|
| *H04L 51/10* | (2022.01) |
| *G06Q 10/0833* | (2023.01) |
| *H04L 51/046* | (2022.01) |
| *H04L 51/52* | (2022.01) |

(52) U.S. Cl.
CPC ......... *H04L 51/10* (2013.01); *G06Q 10/0833* (2013.01); *H04L 51/046* (2013.01); *H04L 51/52* (2022.05)

(58) Field of Classification Search
CPC .... G06Q 10/08; G06Q 10/0833; H04L 51/04; H04L 51/046; H04L 51/06; H04L 51/063; H04L 51/066; H04L 51/07; H04L 51/08; H04L 51/10; H04L 51/18; H04L 51/216; H04L 51/234; H04L 51/52; H04L 51/56; H04L 51/58; H04L 67/02; H04L 67/10; H04L 67/565
See application file for complete search history.

(56) References Cited

U.S. PATENT DOCUMENTS

| | | |
|---|---|---|
| 8,046,266 B1 | 10/2011 | Geller et al. |
| 9,105,016 B2 | 8/2015 | Briggman et al. |
| 9,619,955 B2 | 4/2017 | Eichenblatt |
| 9,830,628 B1 | 11/2017 | Sayre, III |
| 9,990,626 B1 | 6/2018 | Labanca, Jr. et al. |

(Continued)

FOREIGN PATENT DOCUMENTS

CA           2917314 A1       7/2017

*Primary Examiner* — Christopher Biagini
(74) *Attorney, Agent, or Firm* — Cygan Law Offices PC; Joseph T. Cygan

(57) ABSTRACT

A client-server computer system includes a client-side application executing on a computing device, operative to communicate with a native application executing on the computing device to obtain and store a multi-media content file generated using the native application in a native content file format. A server includes a server-side application operative to communicate with the client-side application, and operative to: create an association between the multi-media content file, a recipient computing device, and a courier tracking number; determine that delivery of a parcel associated with the courier tracking number has occurred; and transmit the multi-media content file in the native content file format to the recipient device in response to determining that delivery of the parcel has occurred.

20 Claims, 9 Drawing Sheets

(56)     References Cited

U.S. PATENT DOCUMENTS

| | | | |
|---|---|---|---|
| 10,078,808 | B1 | 9/2018 | Sibon |
| 10,354,216 | B2 | 7/2019 | Gillen et al. |
| 10,373,096 | B2 | 8/2019 | Duquene et al. |
| 10,592,849 | B2 | 3/2020 | Daoura et al. |
| 11,115,629 | B1* | 9/2021 | Lemberger .............. G10L 13/00 |
| 2009/0076918 | A1* | 3/2009 | Blanchet ................ G06Q 30/02 |
| | | | 705/410 |
| 2010/0004935 | A1 | 1/2010 | Wain |
| 2012/0089529 | A1 | 4/2012 | Uslontsev et al. |
| 2012/0303539 | A1 | 11/2012 | Marcus et al. |
| 2013/0024525 | A1 | 1/2013 | Brady et al. |
| 2013/0226728 | A1* | 8/2013 | Oghittu .............. G06Q 30/0621 |
| | | | 705/26.5 |
| 2013/0226740 | A1 | 8/2013 | Biliosa |
| 2013/0346337 | A1 | 12/2013 | O'Donnell et al. |
| 2014/0172734 | A1* | 6/2014 | Ginda .................. G06Q 10/083 |
| | | | 705/330 |
| 2014/0258424 | A1* | 9/2014 | Ganesh ................... H04L 51/18 |
| | | | 709/206 |
| 2015/0088781 | A1 | 3/2015 | Gillen et al. |
| 2015/0227883 | A1* | 8/2015 | Murphy, Jr. ....... G06Q 30/0276 |
| | | | 705/330 |
| 2016/0026974 | A1* | 1/2016 | Zhao ..................... G06Q 30/02 |
| | | | 705/337 |
| 2016/0036739 | A1 | 2/2016 | Glass et al. |
| 2016/0171427 | A1 | 6/2016 | Cao |
| 2016/0323218 | A1* | 11/2016 | Sadanandan ............ H04L 51/10 |
| 2016/0328669 | A1* | 11/2016 | Droege ............ G06Q 10/06311 |
| 2018/0247252 | A1 | 8/2018 | Duquene et al. |
| 2019/0019141 | A1 | 1/2019 | Torii et al. |
| 2019/0354931 | A1* | 11/2019 | Amato ............... H04N 1/00222 |
| 2020/0051015 | A1 | 2/2020 | Davis et al. |
| 2020/0082334 | A1 | 3/2020 | Dotterweich et al. |

* cited by examiner

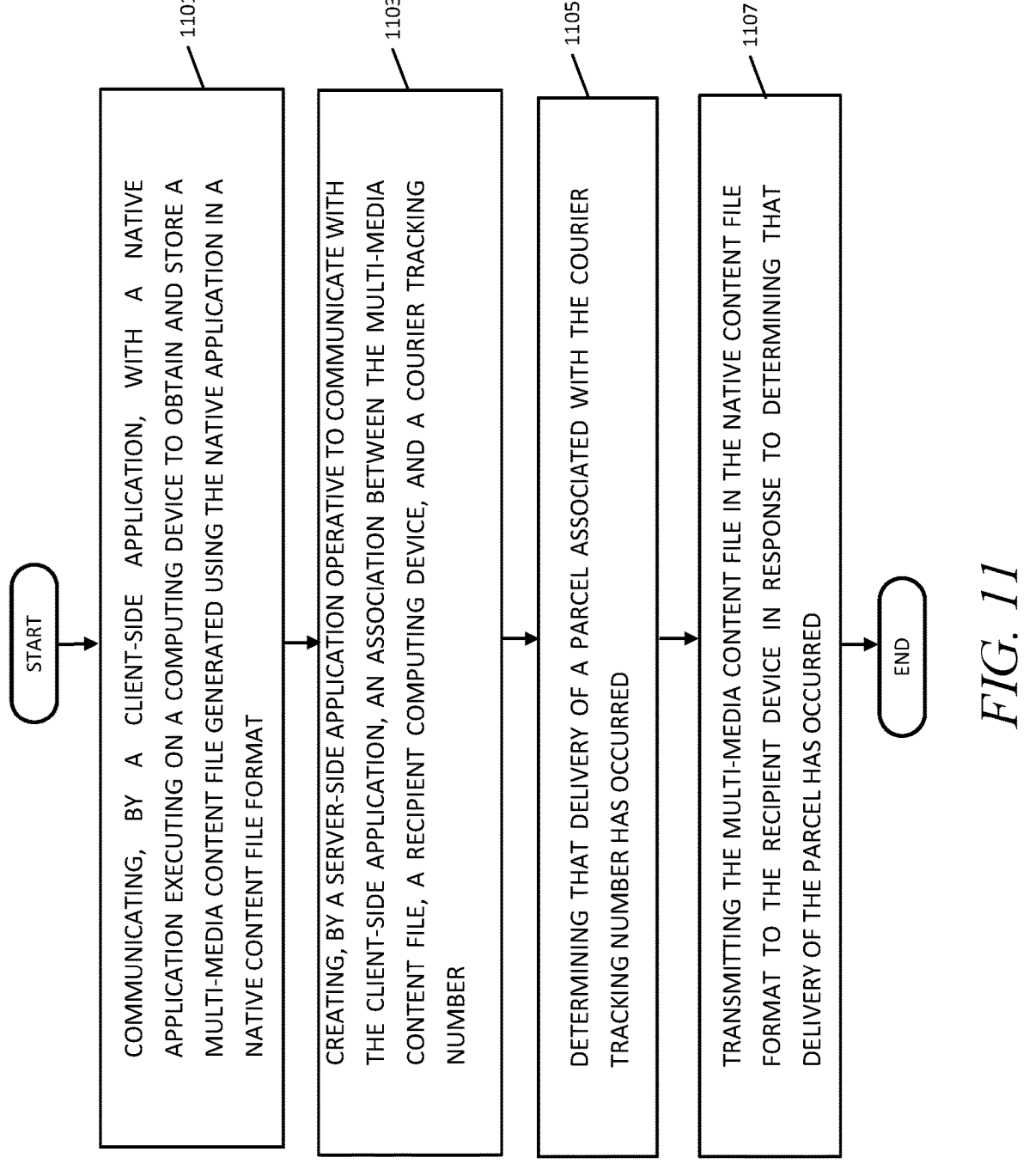

COMMUNICATING, BY A CLIENT-SIDE APPLICATION, WITH A NATIVE APPLICATION EXECUTING ON A COMPUTING DEVICE TO OBTAIN AND STORE A MULTI-MEDIA CONTENT FILE GENERATED USING THE NATIVE APPLICATION IN A NATIVE CONTENT FILE FORMAT — 1101

CREATING, BY A SERVER-SIDE APPLICATION OPERATIVE TO COMMUNICATE WITH THE CLIENT-SIDE APPLICATION, AN ASSOCIATION BETWEEN THE MULTI-MEDIA CONTENT FILE, A RECIPIENT COMPUTING DEVICE, AND A COURIER TRACKING NUMBER — 1103

DETERMINING THAT DELIVERY OF A PARCEL ASSOCIATED WITH THE COURIER TRACKING NUMBER HAS OCCURRED — 1105

TRANSMITTING THE MULTI-MEDIA CONTENT FILE IN THE NATIVE CONTENT FILE FORMAT TO THE RECIPIENT DEVICE IN RESPONSE TO DETERMINING THAT DELIVERY OF THE PARCEL HAS OCCURRED — 1107

*FIG. 11*

APPARATUS, SYSTEM AND METHODS FOR MANAGING PRIVATE CONTENT DELIVERY IN ASSOCIATION WITH A SHIPMENT

CROSS-REFERENCE TO RELATED APPLICATIONS

The present application is a Continuation of U.S. patent application Ser. No. 17/866,266, filed Jul. 15, 2022, issuing as U.S. Pat. No. 11,818,085 on Nov. 14, 2023, which was a Continuation of U.S. patent application Ser. No. 17/001,638, filed Aug. 24, 2020, issued as U.S. Pat. No. 11,425,070 on Aug. 23, 2022, which further claimed priority to U.S. Provisional Patent Application No. 62/891,276, filed Aug. 24, 2019, all of which are hereby incorporated by reference herein in their entirety.

FIELD OF THE DISCLOSURE

The present disclosure relates generally to courier delivery systems and more particularly to content delivery systems.

BACKGROUND

As the traditional brick and mortar commerce industry and the eCommerce industry continue to evolve, consumers seek the ability to gain greater control and instill more personalized attributes onto their transactions particularly during the transport of goods by way of courier. Package couriers use tracking numbers to track parcel deliveries from the shipping point to the delivery point. Some couriers provide a feature on their website that allows shippers to send notification emails to themselves and to the parcel recipient with information regarding the parcel delivery from initial pick-up of the parcel by the courier, up to delivery at the specified delivery address. Therefore, message content is being stored within a system of the courier, which may create privacy concerns. These courier email systems require having an account setup with the courier in order to use them. Most online purchases include use of a courier for shipping to the recipient. However, purchasers that purchase items for another party do not have access to the message system of the courier.

BRIEF DESCRIPTION OF THE DRAWINGS

FIG. 11 is a flowchart of a method of operation of a message content management, in accordance with an embodiment.

DETAILED DESCRIPTION

Figure 1:
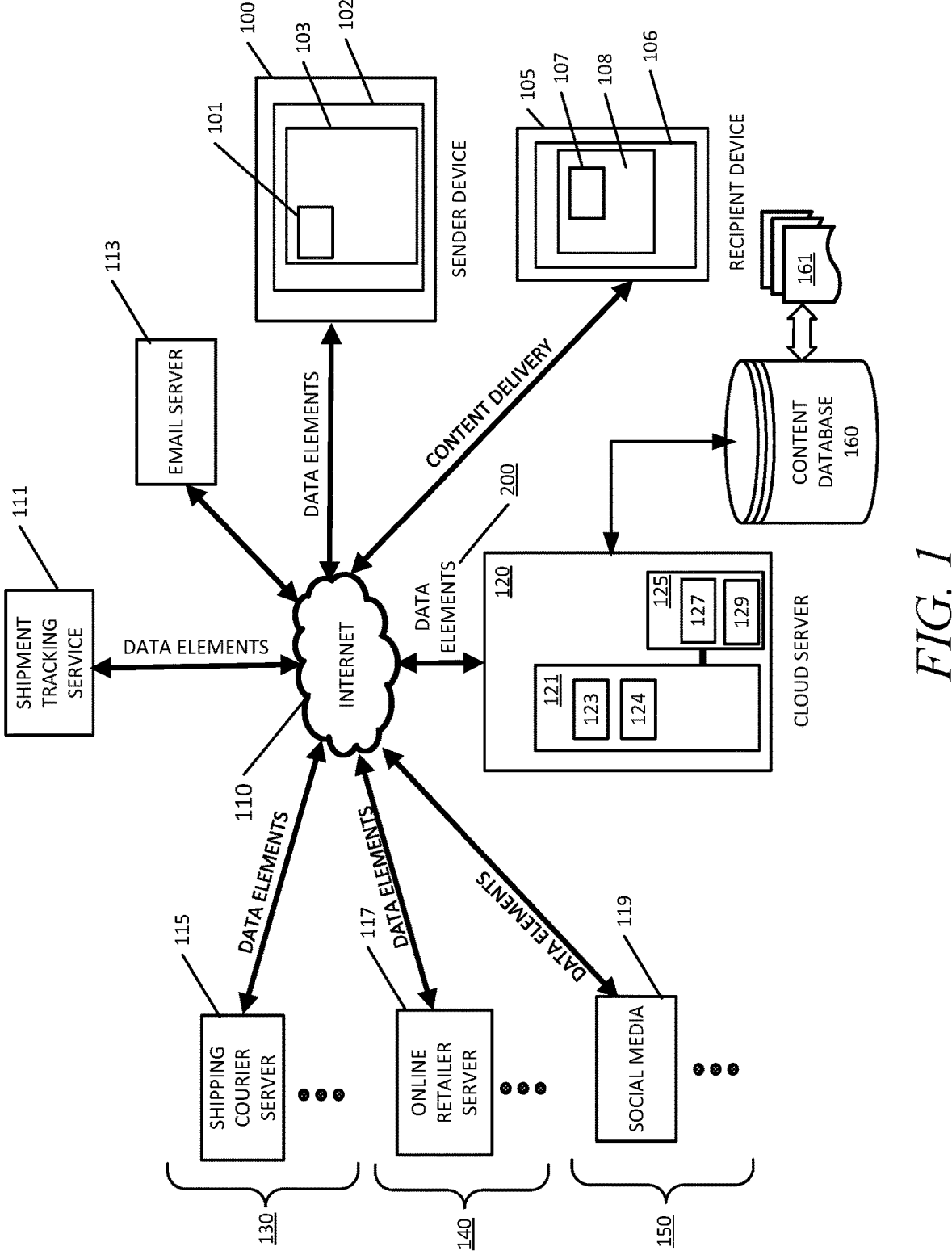
FIG. 1 is a diagram of a message content management system, in accordance with various embodiments.

Briefly, the present disclosure provides a client-server computer system and method of operation that enables sending timed content created in a native application on a sending device in a native application content file format, to a receiving device based on occurrence of a shipment of a parcel by a courier service. The courier service tracking information is used to send the timed content, independently from the courier service and any of its messaging systems. Because messages may be sent directly from the sending device to the recipient device without third-party access to the content, stronger privacy is maintained in the transmission of the content.

The present disclosure provides a client-server application where the client-side application can execute on a mobile device or any Internet connected device such as a laptop computer etc. The client-side application may be implemented a software-as-a-service SaaS application that can be accessed via a web-browser. When a package or envelope is shipped using a courier, the client-side application, or a native application resident on the sending device, may be used to create a message that is to be delivered to the package or envelope recipient upon delivery by the courier. The message can be a type of content such as multimedia content, text, an image or a video message, etc. The courier tracking number is input into the client-side application, or the client-side application obtains it using machine learning, along with the recipient's mobile device number or other identification.

The server-side application uses the courier tracking number to track the movement of the package or envelope and can transmit one or more messages to the recipient in response to final delivery, or in response to steps in the delivery process. For example, if a delivery is made, when the delivery arrives at the recipient's location, the server-side application will transmit the message to the recipient's mobile device as a multi-media message. In some embodiments, the server hosting the server-side application may include a wireless modem operative to send multi-media messages to mobile devices over a wireless network. In other embodiments, the server hosting the server-side application may send a multi-media message using an Instant Messaging (IM) multi-media message via an Internet connection.

The present disclosure provides a client-server computer system that includes: a client-side application executing on a computing device, operative to communicate with a native application executing on the computing device to obtain and store a multi-media content file generated using the native application in a native content file format; a server that includes a server-side application operative to communicate with the client-side application, and operative to: create an association between the multi-media content file, a recipient computing device, and a courier tracking number; determine that delivery of a parcel associated with the courier tracking number has occurred; and transmit the multi-media content file in the native content file format to the recipient device in response to determining that delivery of the parcel has occurred.

The client-side application may be further operative to control the native application to transmit the multi-media content file to the recipient computing device. The server-side application may be further operative to determine that delivery of a parcel associated with the courier tracking number has occurred without accessing the courier tracking system. The server-side application may be further operative to provide a link to the recipient device to access the multi-media content file on a remote computing device. The server-side application may be further operative to provide a link to the recipient device to access the multi-media content file on a social media server.

The client-side application may be further operative to access an email application executing on the computing device to obtain the courier tracking number without requiring user input. The client-side application may be further operative to access an email application executing on the computing device to transmit the multi-media content file to the recipient computing device. The client-side application may be further operative to access a messaging application executing on the computing device to transmit the multi-media content file to the recipient computing device. The client-side application may be further operative to access a social media server to transmit the multi-media content file to the recipient computing device via a social media platform.

The present disclosure also provides a method of operation that includes: communicating, by a client-side application, with a native application executing on a computing device to obtain and store a multi-media content file generated using the native application in a native content file format; creating, by a server-side application operative to communicate with the client-side application, an association between the multi-media content file, a recipient computing device, and a courier tracking number; determining that delivery of a parcel associated with the courier tracking number has occurred; and transmitting the multi-media content file in the native content file format to the recipient device in response to determining that delivery of the parcel has occurred.

The method may further include controlling, by the client-side application, the native application to transmit the multi-media content file to the recipient computing device. The method may further include: determining, by the server-side application, that delivery of a parcel associated with the courier tracking number has occurred without accessing the courier tracking system. The method may further include providing, by the server-side application, a link to the recipient device to access the multi-media content file on a remote computing device. The method may further include providing, by the server-side application, a link to the recipient device to access the multi-media content file on a social media server. The method may further include accessing, by the client-side application, an email application executing on the computing device to obtain the courier tracking number without requiring user input. The method may further include accessing, by the client-side application, an email application executing on the computing device to transmit the multi-media content file to the recipient computing device. The method may further include accessing, by the client-side application, a messaging application executing on the computing device to transmit the multi-media content file to the recipient computing device. The method may further include accessing, by the client-side application, a social media server to transmit the multi-media content file to the recipient computing device via a social media platform.

The present disclosure also provides non-transitory, non-volatile computer readable memory that includes executable instructions for execution by at least a first processor and a second processor, that when executed cause the at least a first and second processor to: communicate, by a client-side application executing on a first processor, with a native application executing on a computing device to obtain and store a multi-media content file generated using the native application in a native content file format; create, by a server-side application executing on a second processor, operative to communicate with the client-side application, an association between the multi-media content file, a recipient computing device, and a courier tracking number; determine, by the server-side application, that delivery of a parcel associated with the courier tracking number has occurred; and transmit, by the server-side application, the multi-media content file in the native content file format to the recipient device in response to determining that delivery of the parcel has occurred.

The executable instructions when executed, may further cause the first processor to: control, by the client-side application, the native application to transmit the multi-media content file to the recipient computing device. The executable instructions when executed, may further cause the second processor to: determine, by the server-side application, that delivery of a parcel associated with the courier tracking number has occurred without accessing the courier tracking system.

The present disclosure provides a system, apparatuses, and methods that enable a sender of shipments the ability to compose their own tailored communication content and to transmit the tailored communication message in conjunction with the shipment delivery process in which a courier is used to transport the shipment. However, the use of the courier's message transmission system is not required. A new messaging delivery process has been established by the present disclosure.

As used herein, the terms "shipment" and "package" can be used interchangeably. The terms "carrier," "courier," and "delivery agent" can be used interchangeably. The terms "tailored communication content," "tailored communication message," "tailored communication content message" and "content" can in some instances be used interchangeably.

According to various embodiments, a system, apparatuses, and methods for providing a pathway for transmission of tailored communication message(s) in combination with shipments, packages or deliveries as they progress from origin pick-up to destination delivery by way of carrier are disclosed. The disclosed process creates a passageway for communication between sender and receiver of a shipment during the shipment transport progression, which includes origin pick-up and destination delivery and all activity that takes place while in-transit.

The disclosed processes place no limits on which entity or on what type of technology such as, but not limited to, artificial intelligence the composer of the tailored communication message is or will be. There are no limits or restrictions on the tailored communication content or the tailored messages that are created. Tailored communication messages can be transmitted through path(s) that exist apart from any carrier communication system(s).

In today's package transportation and delivery industries, the carrier and/or consignor control communication content that may be customized in some fashion and that is allowed passage in conjunction with the transport of packages/shipments. The communication content message transfer is also routinely one-directional while limitations exist with the ownership of the "content transfer authority." This present disclosure broadens the communication exchange scope that may take place during package transport while widening the exchange flows from one-directional to multi-directional paths. This new process further expands the granted authority to compose and to communicate tailored communication content via recorded and/or real-time and/or close to real-time means by parties that are directly, in-directly or not involved in eCommerce entities, and/or commerce entities and/or carriers within the package transportation and/or package delivery industry. The herein disclosed systems, apparatuses and methods allow senders and receivers access to this pathway to enhance their transactions.

Turning now to the drawings, FIG. 1 is a block diagram of a message content management system in which a cloud server 120 is operative to establish Internet 110 connections and communicate with various computing devices, including a sender device 100, a recipient device 105, an email server 113, a shipment tracking service 111, various shipping courier servers 130 such as example shipping courier server 115, various online retailer servers 140 such as example online retailer server 117, and various social media servers 150 such as example social media server 119. The cloud server 120 is one type of apparatus of an embodiment and the various devices such as sender device 100 and recipient device 105 are each another type of apparatus of the embodiments.

The cloud server 120 along with the various computing devices such as sender device 100, recipient device 105, shipment tracking service 111, and connectivity with the various shipping courier servers 130, retailer servers 140, and various social media servers are one type of message content management system according to the embodiments.

The sender device 100 and recipient device 105 are computing devices such as, but not limited to a smartphone. The term "computing device" as used herein may refer to, for example, a server, a desktop computer, a laptop computer, a tablet computer or a smartphone. The term "smartphone" as used herein refers to a wireless mobile telephone that includes a built-in camera and location hardware such as a Global Positioning System (GPS) chipset. Therefore, the term "smartphone" as used herein refers to a specific type of "computing device."

The sender device 100 includes, among other things, a display 102 and is operative to display an application graphical user interface (GUI) 101 of a message content management system application. The GUI 101 may be displayed within a web browser 103 in some embodiments. The application executing on sender device 100 is operatively coupled to the cloud server 120 via the Internet 110, and is operative to send and receive various data elements 200 to and from the cloud server 120, respectively.

The recipient device 105 also includes a display 106 and is operative to display content 107 that is generated by the sender device 100. The content 107 is received via an Internet 110 connection or via a wireless service such as short message service/multimedia service (SMS/MMS) and may be displayed in an application window 108 of any of various applications such as, but not limited to, a web browser, and SMS/MMS client, etc.

In accordance with the embodiments, the cloud server 120 is accessible via a network, such as the Internet 110, and is accessible by each of the computing devices over an Internet Protocol (IP) connection. The any of the various computing devices such as, but not limited to, the sender device 100, may be a subscriber to a message content management service provided by the cloud server 120. The term "cloud server" as used herein, refers to a server, accessible by an Internet connection, that is operative to host one or more applications that may be accessed by a computing device using a web browser or an application resident on the computing device. A "cloud server" is operative to provide a software-as-a-service (SaaS) application that can be accessed by computing devices via a web-browser. The cloud server 120 is operative to interact with applications installed and resident on computing devices and also to provide a software-as-a-service (SaaS) application that can be accessed by computing devices via a web-browser. The message content management system application herein disclosed may be implemented as an SaaS application, an/or using a platform-as-a-service (PaaS), an infrastructure-as-a-service (IaaS) or by an on-premises application server, etc. without limitation.

The sender device 100, among other things, is operative to receive an installable mobile application via a content push operation from the cloud server 120, and to install the mobile application. The sender device 100, after installing the mobile application, is operative to use the mobile application to send data elements and content files to the cloud server 120. The sender device 100 is also operative to receive various data elements and notifications from the cloud server 120. In operation, sender device 100, via the mobile application, is logged in to a message content management service application server 123 as a client device and maintains a persistent Internet Protocol (IP) connection with the cloud server 120. In some embodiments, there is no installed mobile application and the sender device 100 is operative to access the message content management service application server 123 as a client device via the web browser 103 and displays the GUI 101 within the web browser 103. In that case, the web browser 103 maintains a persistent IP connection with the cloud server 120 via, for example, one or more web socket connections.

The sender device 100 may use the GUI 101 to perform various operations such as entering recipient device contact information, uploading content to the cloud server 120, providing links to content on other servers, creating content and associating content with recipient device contact information. The term "content" as used herein refers to a digital file, which may be in any of various formats, and which may be stored as digital data in a "content file" (i.e. a "digital file," "data file," "electronic file," "image file," "document file," "multimedia file," etc. without limitation) and in any of various locations accessible via an Internet 110 connection. Therefore "content" as used herein may be displayed, viewed, played, etc., on a computing device display, audio system, etc. of a recipient device 105 display and audio equipment, sender device 100 display and audio equipment, etc. The terms "content file" and "data file" may be used herein interchangeably to refer to the data file which may be stored, displayed, played, etc. A "content file" or "data file" may be for example, but not limited to, a ".jpg," ".bmp," ".gif," ".tiff," ".pdf," ".wav," ".mov," ".MP3," ".MP4," SMS/MMS message file, email message file, a proprietary file format or any other file format suitable for electronic storage of electronic files without limitation.

The cloud server 120 may further be integrated with, or operatively coupled to, a content database 160. The cloud server 120 may access and communicate with the content database 160 using any appropriate database access protocol. In some embodiments, the content database 160 maintains content files 161 uploaded to the cloud server 120 by various sender devices 100. The content database 160 may be integrated with the cloud server 120 in some embodiments, or may be located physically separate in other embodiments. In most embodiments, content database 160 will be a relational database with the database access protocol using, but not limited to, Structured Query Language (SQL), Open Database Connectivity (ODBC), Java Database Connectivity (JDBC), or some equivalent, etc.

In accordance with the embodiments, the cloud server 120 includes at least one network interface (not shown), at least one processor 121, and a nonvolatile, non-transitory memory 125 that is operatively coupled to the at least one processor 121. The non-volatile, non-transitory memory 125 stores executable instructions (executable code) 127 for a message content management service application server 123 and an interface engine 124 operative to communicate with shipment tracking service 111 and with the various shipping courier servers 130, retailer servers 140, and various social media servers. The memory 125 may also store data such as, but not limited to, login credentials 129 for subscribers to the message content management service application. The memory 125 may also store executable instructions for a web server in some embodiments. The processor 121 is operative to access the memory 125 and to execute the executable instructions 127 stored therein in order to implement the methods of operation of the message content management service application server 123, interface engine 124, and operating system and any other needed utilities, web server, other software, etc. The message content management service application server 123 is operatively coupled, via application programming interfaces (APIs), to the interface engine 124 and any other needed utilities, software, web server, etc., and has read and write access to the content database 160.

The message content management service application server 123 is operative to provide a browser accessible GUI 101 for display on the sender device 100 and may provide other GUIs for each type of server such as, but not limited to, the various shipping courier servers 130, retailer servers 140, and various social media servers. For example, access to the message content management service application provided by message content management service application server 123 may be available as an SaaS subscription service to any of the various shipping courier servers 130 and retailer servers 140, etc., such that they may provide the services to their customers as a value-added service.

The message content management service application server 123 is operative to receive user input (i.e. data) entered via the GUI 101 including, but not limited to, recipient contact information such as, but not limited to, a recipient device 105 phone number, email address, social media identifier, or other identifier, and content or links to content, to be sent to one or more recipient devices 105. In some embodiments, the message content management service application server 123 is integrated with, or interfaces with, a web server to provide the GUI 101 as a web browser 103 accessible GUI.

The sender device 100 user may use the GUI 101 to enter in contact information and shipping information for a delivery to be sent to the user of a recipient device 105. For example, the user of sender device 100 may enter in a shipping courier tracking number. The message content management service application interfaces with the interface engine 124, to communicate with the shipment tracking service 111 to obtain information related to the tracking number. The shipment tracking service 111 is operative to identify the specific shipping courier to which a tracking number is associated with, and to communicate with the specific shipping courier server, of the various shipping courier servers 130, to obtain information related to the tracking number. In this way, there is no necessity for the message content management service application to communicate with the shipping courier servers 130. However, both the message content management service application server 123 and the interface engine 124 are operative to communicate with the various shipping courier servers 130, the various online retailer servers 140 and various social media servers 150 in some embodiments. For example, in some embodiments, the interface engine 124 may access a shipping courier server 115, using a website or by a file transfer protocol (FTP) request, request using HTTP, or some other IP based request, and obtain information related to the tracking number.

The shipment tracking service 111 is operative to use a tracking number or other information to determine when a corresponding delivery has been completed by the relevant shipping courier of the various shipping courier servers 130. The message content management service application provided by the message content management service application server 123 is operative to send content to the recipient device 105 in response to determining that a corresponding associated delivery has been completed by the relevant shipping courier, as determined by a notification message received by the message content management service application server 123 from the shipment tracking service 111 based on the tracking number. The shipment tracking number is associated with a recipient device 105 by a sender device 100 creating an association of the shipment tracking number with an identifier of the recipient device 105 using the GUI 101.

Content delivery may be made to the recipient device 105 by sending a link to content within the content database 160, or content located elsewhere on another server, such as, but not limited to, one of the various social media servers 150. The message content management service application is operative to provide notifications to the sender device 100 when the content delivery has been made.

The message content management service application is operative to handle storage of content files (i.e. data files) received from the sender device 100 by storing the content files 161 in the content database 160. Alternatively, the message content management service application may store links to content files as discussed above. In that case, notifications are sent to the sender device 100 when the content link has been sent to the recipient device 105. The recipient device 105 may then display the content 107.

Figure 2:
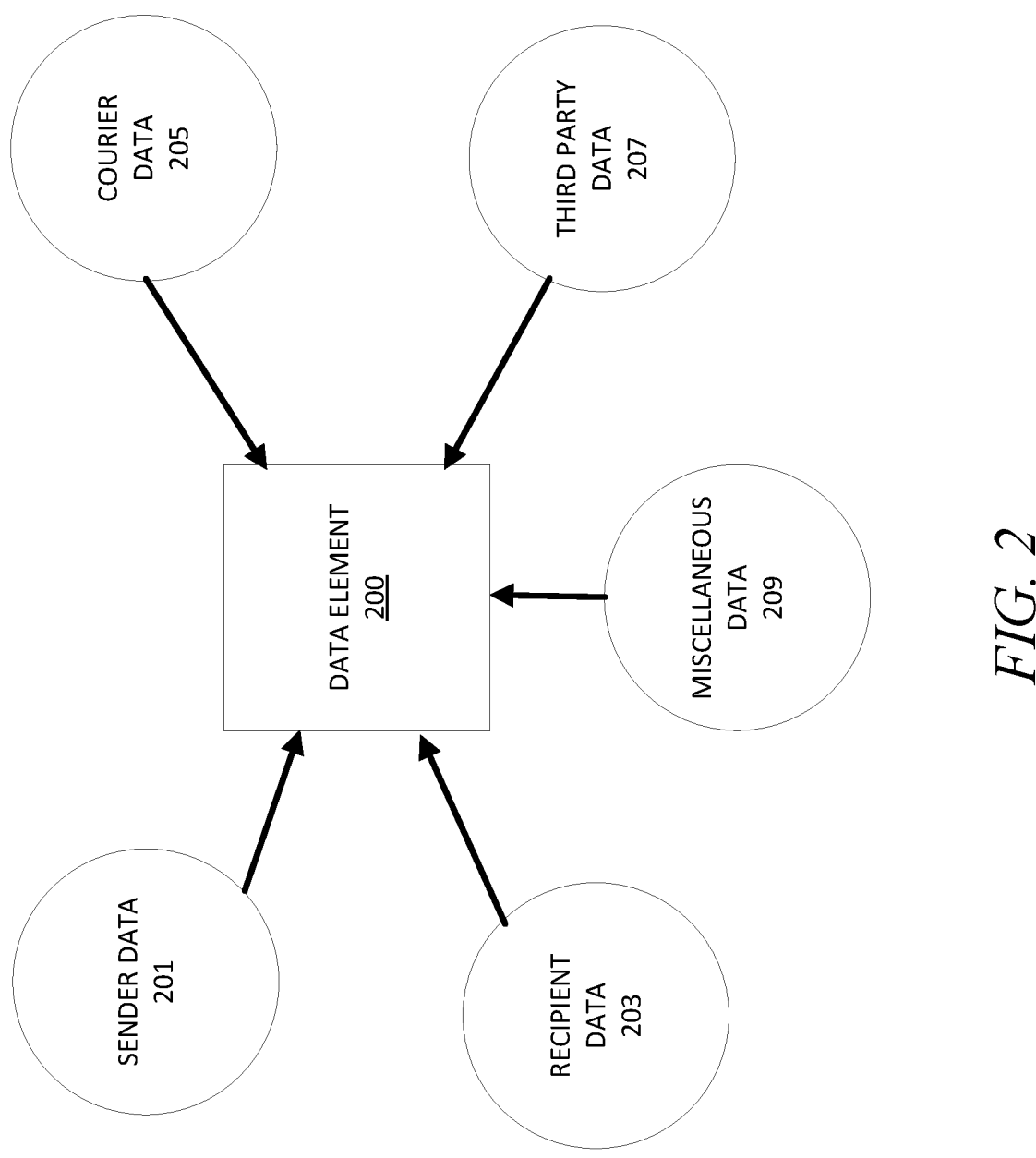
FIG. 2 is a diagram of a data element used by the message content management system in accordance with an embodiment.

The message content management service application may, in some embodiments, communicate with various communication devices using various data elements 200 which may be objects in an object-oriented computing environment. FIG. 2 illustrates an example data element 200. The example data element 200 of FIG. 2, may be constructed using various types of data including, but not limited to, sender data 201, recipient data 203, courier data 205, third-party data 207, and miscellaneous data 209. The sender data 201 includes, but is not limited to, sender contact information, sender device identifier, associated recipient contact information, associated recipient device identification information, delivery tracking numbers, associated content associated with specific recipient contact information, content, content links, and other information. Recipient data 203 includes, but is not limited to, recipient contact information, recipient device identifier, delivery information, content links, and content. Courier data 205 includes, but is not limited to, delivery tracking numbers, courier identification information, delivery scheduling information, and other information. Third-party data 207 includes, but is not limited to, online retailer information, brick-and-mortar store information, delivery information, scheduling information, or other information. Miscellaneous data 209 may be any information that does not fit into the other categories of data.

Figure 3:
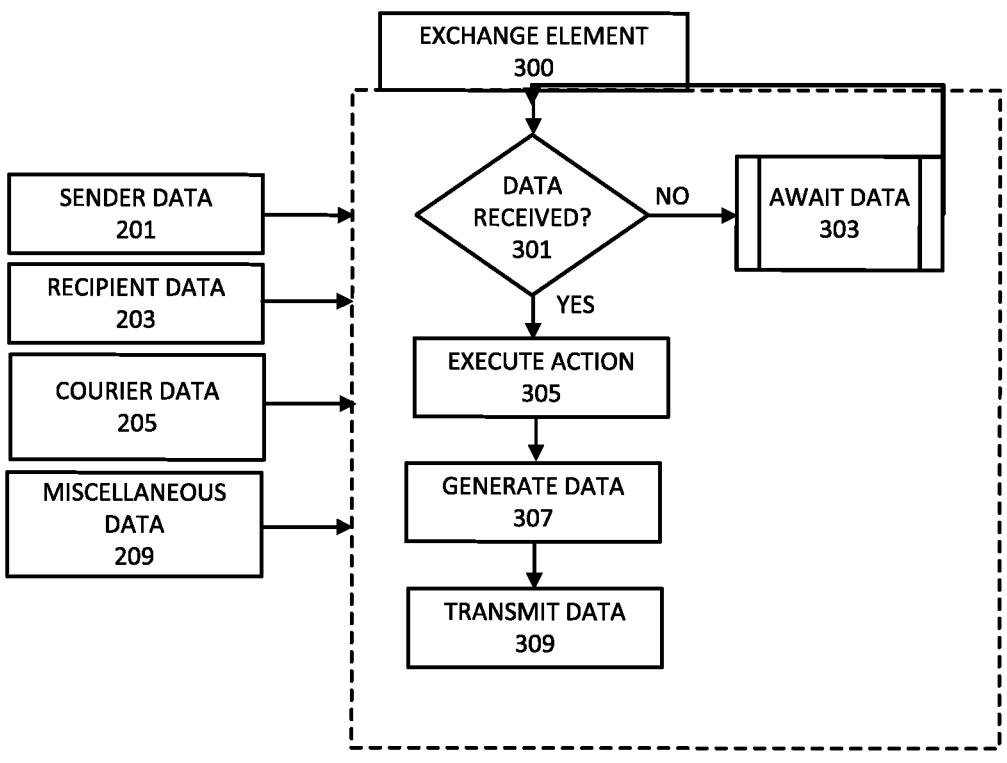
FIG. 3 is a diagram of a data element used by the message content management system in accordance with an embodiment.

The data elements 200 may be considered object-oriented elements utilized by the message content management service application to communicate with the various computing devices according to the example shown in FIG. 1. FIG. 3 provides an example of an exchange element 300. The exchange element 300 may be constructed from, or require as inputs, sender data 201, recipient data 203, courier data 205 or miscellaneous data 209. The exchange element is constructed as data is received in decision block 301. If no data is received related to the exchange element 300, data is waited for as shown in process operation block 303. Once data is received at decision block 301, exchange element 300 executes an action 305 as defined by the specific exchange element 300, generates associated data related to the exchange as shown in operation block 307, and transmits the data is shown in operation block 309.

Figure 4:
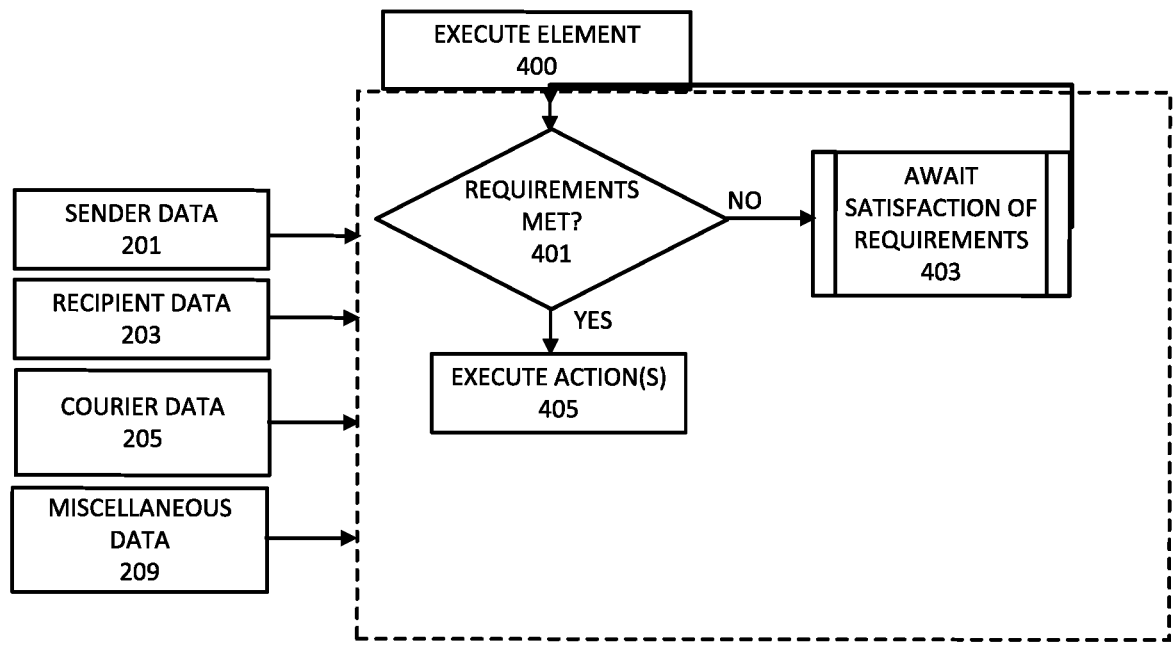
FIG. 4 is diagram of a data element used by the message content management system in accordance with an embodiment.
Figure 5:
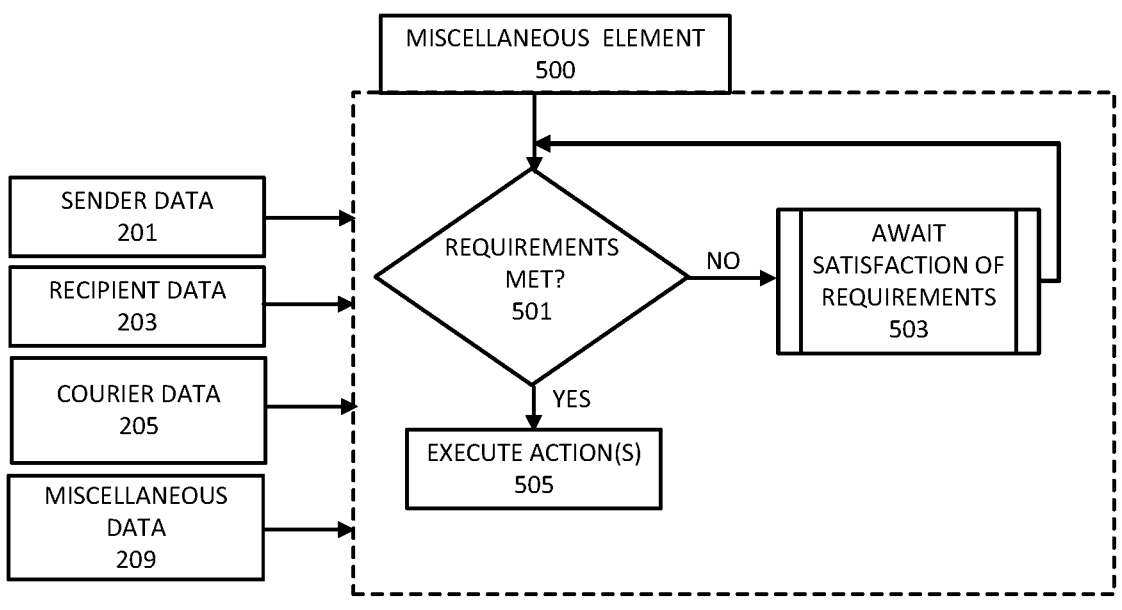
FIG. 5 is a diagram of a data element used by the message content management system in accordance with an embodiment.
Figure 6:
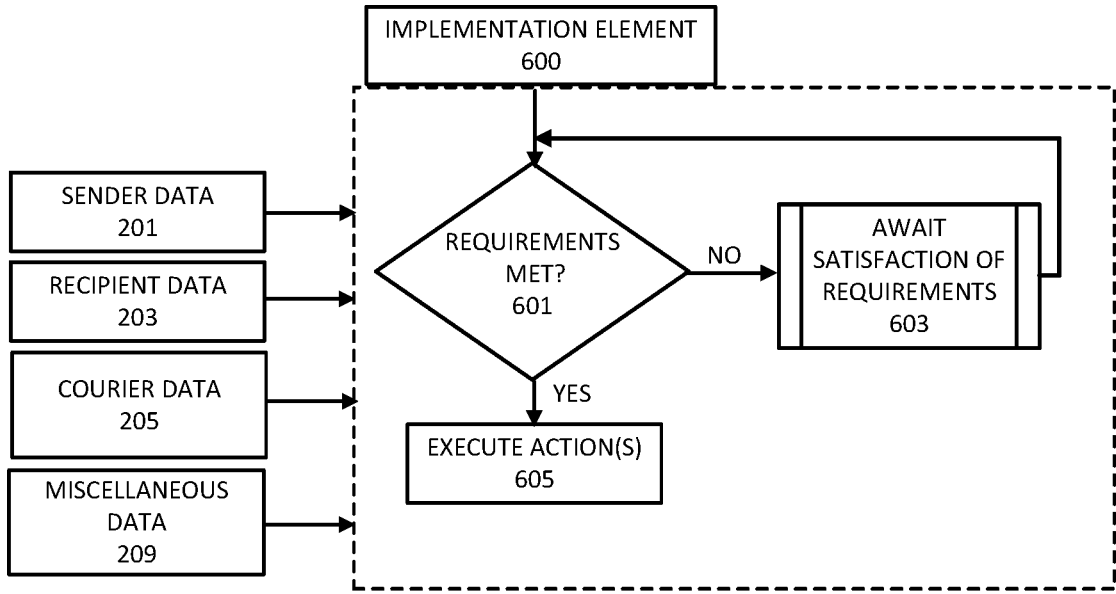
FIG. 6 is diagram of a data element used by the message content management system in accordance with an embodiment.

An example execute element 400 is illustrated in FIG. 4. Similar to the exchange element 300, the execute element 400 may be constructed from, or require inputs from, sender data 201, recipient data 203, courier data 205, or miscellaneous data 209. The execute element 400 is based on certain requirements as shown in decision block 401. If the requirements are not met at decision block 401, then the execute element 400 waits for satisfaction of the requirements as shown in process operation block 403. If the requirements are met decision block 401, and execute element 400 executes the actions associated with it as shown in operation block 405. An example miscellaneous element 500 is illustrated in FIG. 5. The miscellaneous element 500 may be constructed from, or require inputs from, sender data 201, recipient data 203, courier data 205, and miscellaneous data 209. The miscellaneous element 500 is also requirements based. If the requirements are met in decision block 501, then miscellaneous element 500 executes the actions associated with it as shown in operation block 505. If the requirements are not met at decision block 501, then the miscellaneous element 500 waits for satisfaction of the requirements as shown in operation process operation block 503. An example implementation element 600 is illustrated in FIG. 6. The implementation element 600 is requirements based. The implementation element 600 may be constructed from, or require inputs from, sensor data 201 recipient data 203, courier data 205, or miscellaneous data 209. If the requirements are not met block 601, then satisfaction of requirements is waited for in process operation block 603. Once the requirements are met at decision block 601, actions are executed in accordance with the implementation element 600 as shown in operation block 605.

Figure 7:
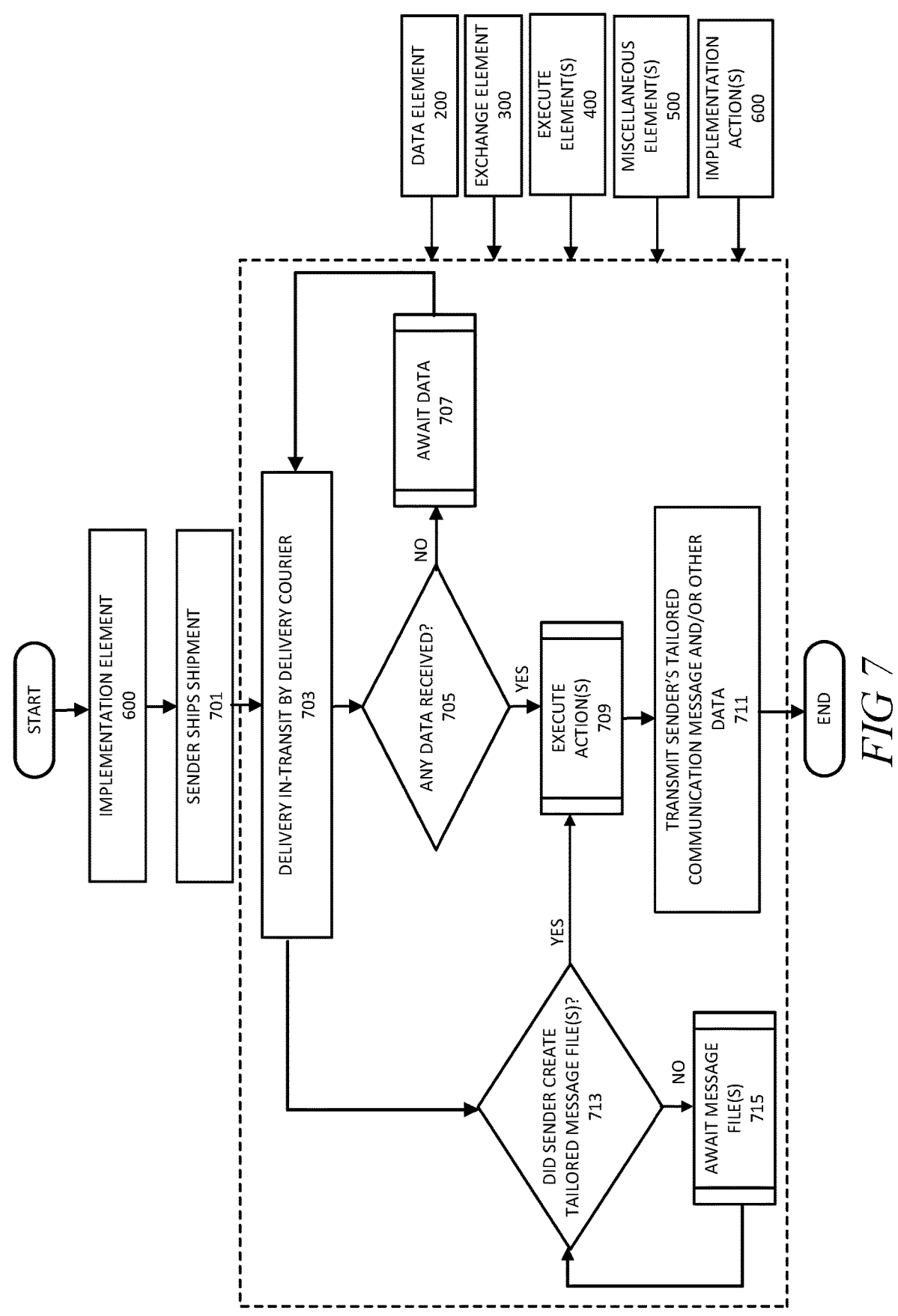
FIG. 7 is a flowchart of a method of operation of a message content management system, in accordance with an embodiment.

FIG. 7 provides an example method of operation of the message content management service application. The method of operation may be executed by an implementation element 600 once all requirements for construction of the implementation element 600 are satisfied. In operation block 701, a sender device 100 sends a shipment which uses a particular courier such as a courier associated with example courier server 115. The cloud server 120 communicates with the shipment tracking service 111 to determine that the delivery is in transit by the delivery courier as shown in operation block 703. The shipment tracking service 111 in turn communicates with the shipping courier server 115 to obtain shipment tracking information and scheduling information based on a tracking number. The cloud server 120 waits for additional data from the shipment tracking service 111 as shown in decision block 705. The cloud server 120 waits for data as shown in process operation block 707 until data is received at decision block 705.

The cloud server 120 also checks whether the sending device 101 has either created content to be associated with the delivery, or has provided links to content associated with the delivery as shown in decision block 713. If not, then the cloud server 120 waits for the content files as shown in process operation block 715. Once data is received from the shipment tracking service 111 in decision block 705, and content associated with the delivery is determined to be present in decision block 713, the cloud server 120 executes the actions required as shown in process operation block 709. In operation block 711, the cloud server 120 transmits the sender's content, links to content, or any other data as required as shown in operation block 711. The method of operation then terminates as shown. The cloud server 120 waits for any associated data elements 200, exchange elements 300, execute elements 400, miscellaneous elements 500, or implementation action 600, data feed into the process operation block 707, process operation block 715, and execute actions process operation block 709.

Figure 8:
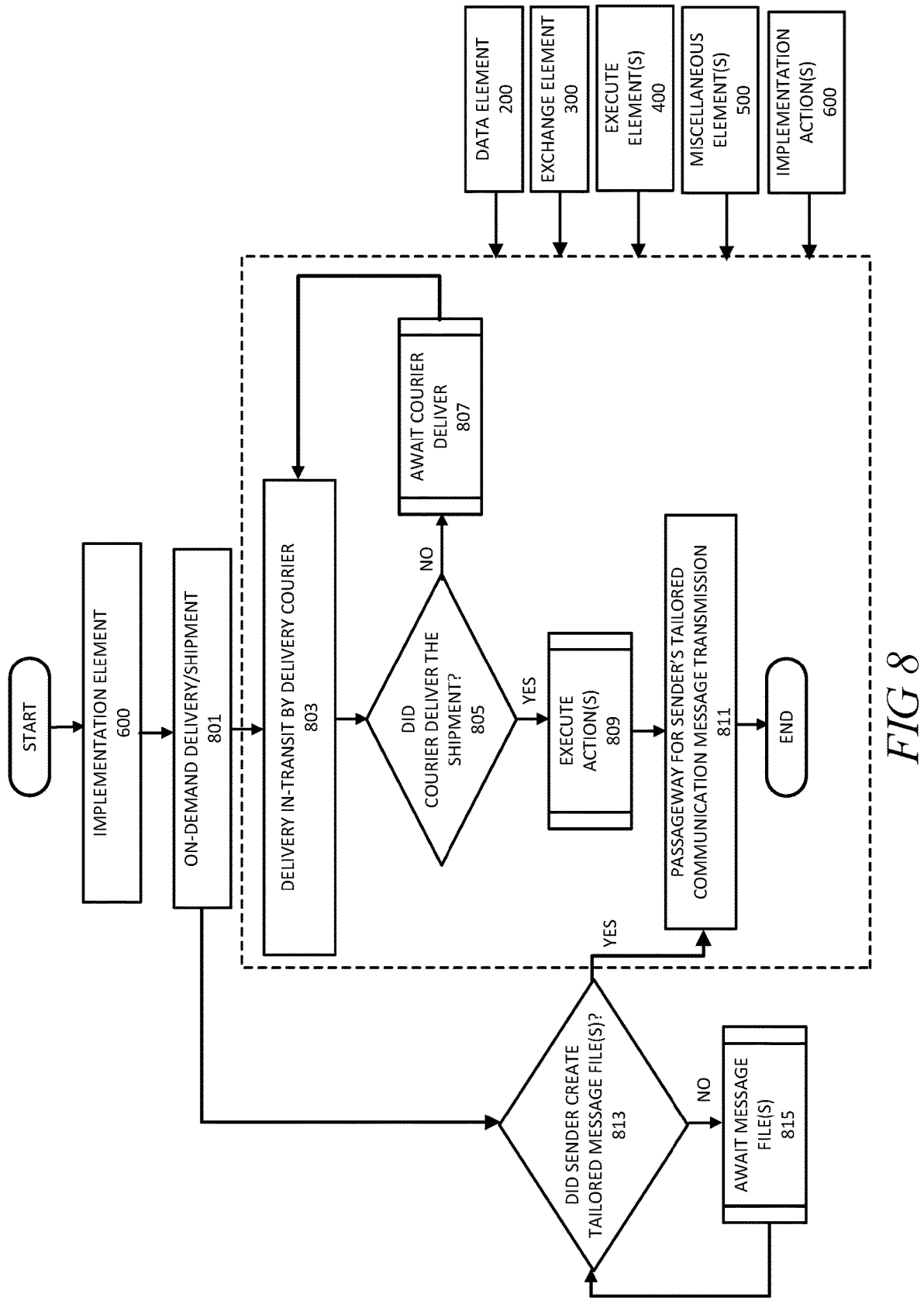
FIG. 8 is a flowchart of a method of operation of the message content management system, in accordance with an embodiment.

FIG. 8 provides another example method of operation of the cloud server 120 and the associated message content management service application. The method of operation may begin in conjunction with an implementation element 600. After a user creates an "on-demand" delivery as shown in operation block 801, which may be done by a user using the sender device 101, the message content management service application cloud server 120 determines that a delivery is in transit by communicating with the shipment tracking service 111. Examples of on-demand delivery services include food delivery services such as, but not limited to GrubHub™, UberEats™, etc. In this example, while the shipment is en-route a recipient, the present system, methods and apparatuses may be used by the on-demand delivery company to transmit their tailored communication message to the recipient device, even if the purchaser is the recipient receiving the on-demand delivery. For example, the on-demand delivery company may send the recipient a message such as "Thank you for using our product" and "Please use this coupon code for future purchases."

During this scenario, the transmission of such message may use delivery notification or geo-fence, Global Positioning Satellite (GPS) or other related satellite or mapping technologies to execute the required actions based on map positioning and other requirements. In this scenario, as the company's delivery resource agent approaches the delivery location to deliver the product, the delivery confirmation or address or longitude and latitude coordinates may be used to execute the required tailored communication message transmission action.

In decision block 805, the cloud server 120 waits to see if it receives a notification from the shipment tracking service 111 with an indication that the courier delivered the shipment. If no notification is received in decision block 805, then the cloud server 120 waits for courier delivery notification as shown in process operation block 807. Once notification is received from the shipment tracking service 111 at decision block 805, the cloud server 120 executes the actions required by process operation block 809.

At decision block 813, the cloud server checks to see whether the sender created content or provided any links to content associated with the delivery. If not, then the cloud server 120 waits for associated content as shown in process operation block 815. Once content is associated by the user in decision block 813, then in operation block 811 cloud server 120 creates the passageway or communication channel to send the content to the recipient device 105. The method of operation then terminates as shown. The cloud server 120 waits for any associated data elements 200, exchange elements 300, execute elements 400, miscellaneous elements 500, or implementation action 600, data feed into the process operation block 807, process operation block 815, and execute actions process operation block 809.

Figure 9:
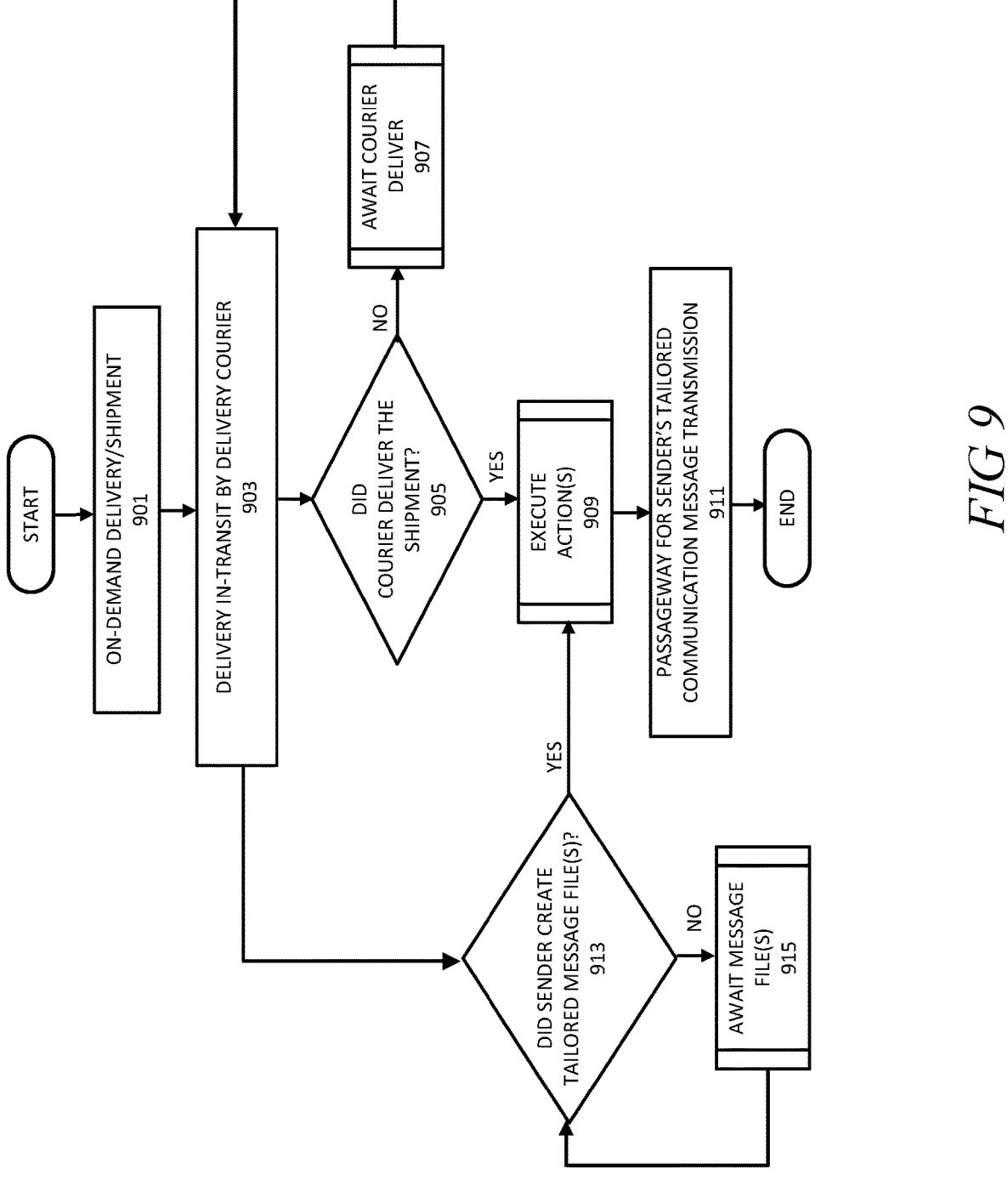
FIG. 9 is a flowchart of a method of operation of a message content management, in accordance with an embodiment.

FIG. 9 provides another example method of operation of the cloud server 120 and the associated message content management service application. The method of operation begins and in operation block 901 cloud server 120 determines that an on-demand delivery has been created and scheduled. In operation block 903, the cloud server determines that a delivery is in transit by a delivery courier. In decision block 905, the cloud server 120 waits for a determination that the courier delivered the shipment. If not, then in process operation block 907 cloud server 120 waits for the courier to deliver the shipment.

In decision block 913, the cloud server 120 checks to see whether the sender has created any content or provided any content links that are associated with the delivery. If not, the cloud server 120 waits for this information as shown in process operation block 915. If the shipment is determined to be delivered by the cloud server 120 in decision block 905, and the sender's associated content is determined to be present in decision block 913, then in process operation block 909 the call server 120 executes the actions associated with content delivery to the recipient device 105. In operation block 911, the cloud server creates the passageway for sending the content to the recipient device 105. The method of operation then terminates as shown.

A "passageway" as referred to above may be establishing APIs with a specific application on a sender device 100, such as but not limited to, an email application, a messaging application, a social media account, etc. Information between the cloud server 120, the sender device 100, the recipient device 105, and the shipment tracking service 111 or other servers shown in FIG. 1, may be accomplished by sending various data elements 200 among and between the various computing devices. For example, exchange elements 300 may be used by the cloud server 120 to communicate data to, and receive data from, shipment tracking service 111. The execute element 400 may be used to execute actions in the process operation blocks of the above discussed flowcharts, and where other data elements 200 are required in order to enable execution of the associated actions. Miscellaneous elements 500 and implementation element 600 may be used for communication over various APIs and with the various computing devices in order to achieve the specific operations associated with applications running on any of the various communication devices for which the various APIs are associated. Thus for example, a miscellaneous element 500 or implementation element 600 may be associated with specific requirements of an application which is being communicated with by the cloud server 120 to an application resident on the sender device

101 or any of the various computing devices in order to obtain data, communicate data or achieve a specific result through control and/or usage of the application running on the operatively coupled computing device.

Figure 10:
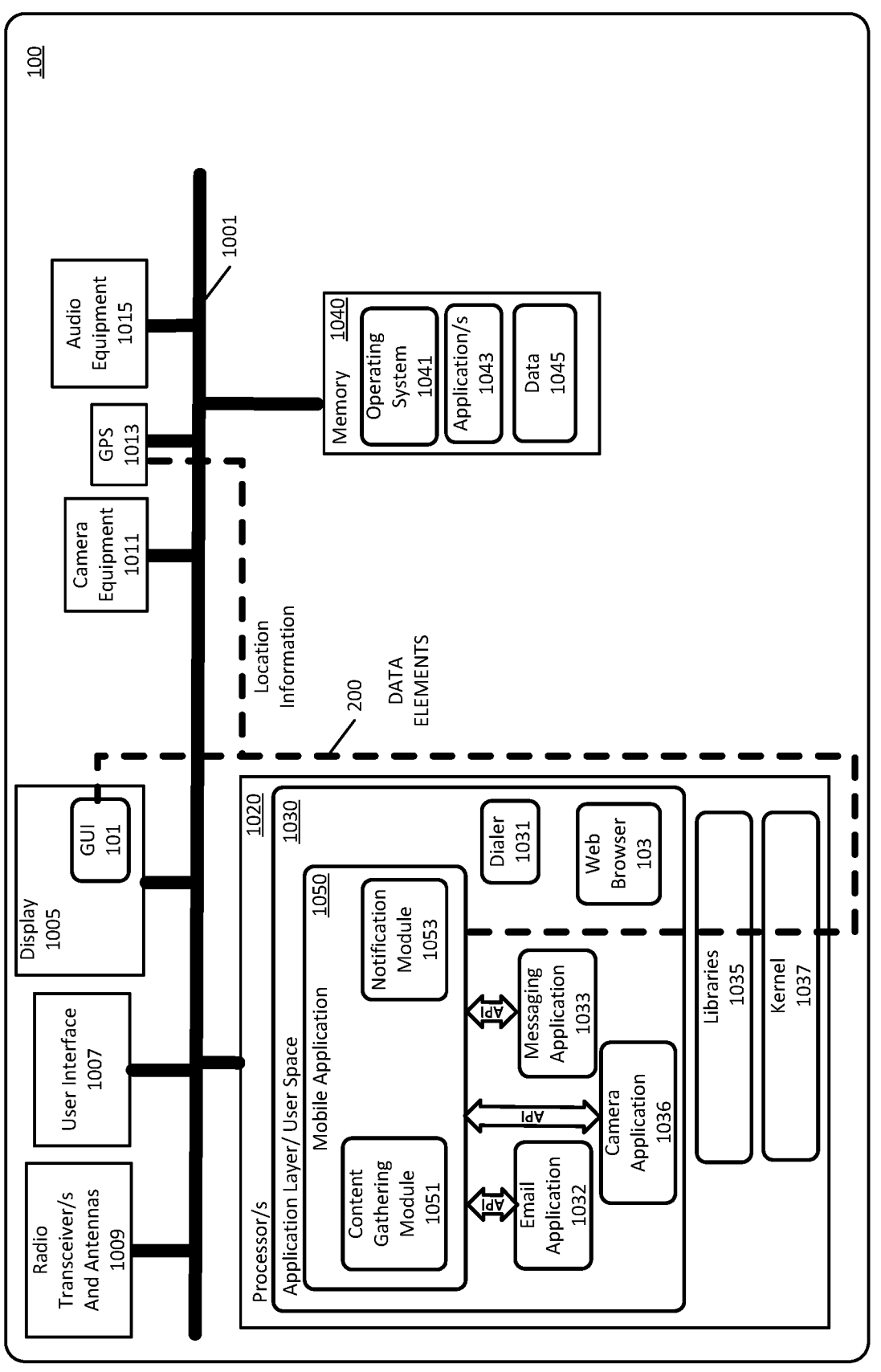
FIG. 10 is a diagram of an example computing device which may be used as a sender device in accordance with an embodiment.

FIG. 10 is block diagram of a sender device 100 that has a mobile application 1050 installed in accordance with an embodiment. The mobile application 1050 provides the GUI 101. Alternatively, the sender device 100 may access the message content management service application via the web browser 103 and access the GUI 101 via the web browser 103. The mobile application 1050 includes a content gathering module 1051 and a notification module 1053, one or both of which may be implemented as modules of the mobile application 1050 in some embodiments. One or both of the content gathering module 1051 and a notification module 1053 may be implemented as software or firmware (or as a combination of software and firmware) executing on one or more processors, and may also include, or may be implemented independently, using ASICs (application specific integrated circuits), DSPs (digital signal processors), hardwired circuitry (logic circuitry), or combinations thereof. That is, one or both of the content gathering module 1051 and the notification module 1053 may be implemented using an ASIC, DSP, executable instructions executing on a processor, logic circuitry, or combinations thereof. In the example of FIG. 10, the content gathering module 1051 and the notification module 1053 are implemented as executable instructions (i.e. as mobile application 1050) stored in non-volatile, non-transitory memory 1040 and executed by processor 1020.

One or more internal connection buses 1001 provide operative coupling between the processor 1020 and the other various sender device 100 components. As used herein, components may be "operatively coupled" when information can be sent between such two components, even though there may be one or more intermediate or intervening components between, or along the connection path. Therefore, any of the various components connected to the internal connection buses 1001 may be understood herein to be operatively coupled to the processor 1020 or to each other where appropriate. Operative coupling may also exist between modules or components implemented as software or firmware executing on a processor and such "software coupling" may be implemented using libraries 1035 (i.e. application programming interfaces (APIs)) or other software interfacing techniques as appropriate. Such libraries or APIs are shown illustrated as providing operative coupling between various software implemented modules or components in FIG. 10. For example, an API enables the mobile application 1050 to communicate with, and/or invoke, an email application 1032, messaging application 1033 and camera application 1036, and another API enables the content gathering module 1051 to interact with the camera application 1036 and interact with camera equipment 1011. The mobile application 1050 is operative to communicate with the camera application 1036 via an API such that, the camera application 1036 may be used to scan a shipping label bar code or QR code, etc. to obtain a courier tracking number. The mobile application 1050 is operative to automatically send a scanned courier tracking number to the cloud server 120.

The memory 1040 is a non-volatile, non-transitory memory, and stores the executable instructions corresponding to various applications 1043, including the mobile application 1050, and executable instructions corresponding to an operating system 1041. The memory 1040 may also store data 1045 specific to the sender device 100 user such as, but not limited to, user settings and personal information. The operating system 1041 executable instructions, when executed by processor 1020, provide an application layer (or "user space" 1030) for running the various applications including mobile application 1050, libraries 1035 and a kernel 1037 which provides interfaces to various hardware components of the sender device 100. The processor 1020 is operative to access the memory 1040 and execute the stored executable instructions to perform the methods of operation disclosed herein as well as to perform other functions and operations such as running the sender device 100 operating system, etc.

The sender device 100 includes various component known and understood by those of ordinary skill in the art such as, but not limited to, audio equipment 1015 with at least one microphone and a speaker, and various audio processing components; wireless radio transceiver/s and antennas 1009, which may include a wide area network (WAN) transceiver to provides wireless communication capabilities for one or more wide area network communications systems using any of various technologies such as, but not limited to, CDMA, UMTS, GSM, LTE, etc. and also provides Internet connectivity over the wireless interface to communicate with the cloud server 120. Also, as known and understood by those of ordinary skill in the art, a second wireless transceiver may also be present in the sender device 100 which may provide wireless local area network connections, peer-to-peer connections, etc. and may provide wireless connectivity using technologies such as, but not limited to, WiFi®, Bluetooth®, Wireless USB, ZigBee, or other technologies, etc. The WLAN transceiver, when present, may also provide Internet connectivity. Any present WAN transceivers and/or WLAN transceivers are operatively coupled to one or more antennas.

A user interface (UI) 1007 may include a track ball mouse, touch sensitive elements, physical switches, gyroscopic position sensors, etc. The sender device 100 includes camera equipment 1011 as is familiar to most communication device users. A display 1005 may be a liquid crystal display (LCD) and may provide a touchscreen capability that is part of the UI 1007 as known and understood by those of ordinary skill. The processor 1020 is operative to control the display 1005 to provide a graphical user interface (GUI) related to the sender device 100 operating system, a GUI related to one or more sender device 100 applications, including the GUI 101 related to mobile application 1050, etc.

Global Positioning System (GPS) hardware 1013 is operative to provide location data such as, but not limited to, GPS coordinates. The mobile application 1050 is operative to communicate with the GPS hardware 1013 to obtain location data from time-to-time, if authorized to do so by user preferences that the user may set for the mobile application 1050. The mobile application 1050 may be operative to invoke the dialer 1031 application to initiate a phone call. The mobile application 1050, via the content gathering module 1051, is also operative to send control information to the camera application 1036 and/or the camera equipment 1011 for the purposes of controlling the camera equipment 1011 to capture one or more images or videos (i.e. to create content). The content gathering module is operative to, in turn, receive image or video information from the camera application 1036 and/or the camera equipment 1011 including any associated audio captured by the audio equipment 1015. The audio equipment 1015 microphone may be used by the content gathering module 1051 to record audio files as content.

In some embodiments, the mobile application 1050, including the content gathering module 1051, the notification module 1053 or both, may operate at the application layer of an IP protocol stack (not shown) executed by the processor 1020 to facilitate IP communications with the cloud server 120. An API enables the mobile application 1050 to communicate with one or more wireless protocol stacks (and corresponding transceivers) to send image information to the cloud server 120 over a wireless interface using either a WAN transceiver or WLAN transceiver, whichever is available. The image information may be sent to the cloud server 120 in response to capturing content by the content gathering module 1051.

The mobile application 1050 is operative to communicate with the various components within the sender device 100 and with the cloud server 120. For example, the mobile application 1050 is operative to interact with the display 1005 to provide a GUI 101 and with various communication mode applications such as, but not limited to, a telephone dialer 1031 application. The mobile application 1050 provides the GUI 101 to, among other things, display notifications received from the cloud server 120 by the notification module 1053. The mobile application 1050 communicates with the message content management service application server 123, to receive notifications related to the status of content delivery to recipient devices 105, or other notifications.

It is to be understood that he mobile application 1050 or "modules" such as the content gathering module 1051 and/or notification module 1053 may be implemented as software or firmware (or a combination of software and firmware) executing on one or more processors, or using ASICs, (application-specific-integrated-circuits), DSPs (digital signal processors), hardwired circuitry (logic circuitry), state machines, FPGAs (field programmable gate arrays) or combinations thereof. Such software or firmware may be referred to herein as executable instructions or executable code and may be stored in non-volatile, nontransitory memory. Therefore, the mobile application 1050 shown being executed by processor 1020 on sender device 100 illustrated in FIG. 10 is one example embodiment and is not to be construed as a limitation on the various other possible embodiments that may be implemented in accordance with the present disclosure. In embodiments in which the mobile application 1050 or one or more modules is implemented as software, or partially in software/firmware, the executable instructions may be stored in the operatively coupled, non-volatile, non-transitory memory 1040, or in on-chip or on-die non-volatile, non-transitory memory (not shown), or combinations thereof, and may be accessed by the processor 1020, or other processors, as needed.

Therefore, in one example embodiment, one of the content gathering module 1051 or notification module 1053, or both, may be implemented as a combination of software and firmware) executing on one or more processors. In another example embodiment, one of the content gathering module 1051 or notification module 1053, or both, may be implemented as an ASIC. In another example embodiment, one of the content gathering module 1051 or notification module 1053, or both, may be implemented using a DSP. In another example embodiment, one of the content gathering module 1051 or notification module 1053, or both, may be implemented using an FPGA. Other embodiments having other implementations are contemplated by the present disclosure.

The various embodiments also include non-volatile, nontransitory computer readable memory, other than memory 1040, that may contain executable instructions (i.e. executable code), for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as servers, sender device 100 or other devices such as those that may benefit from the features of the herein described embodiments. For example, executable instructions for the mobile application 1050 in its entirety, the content gathering module 1051 and/or the notification module 1053, may be stored on any of the above described forms of non-transitory, non-volatile computer readable memory. In another example, instructions for the message content management service application server 123, may be stored on any of the above described forms of non-transitory, non-volatile computer readable memory.

FIG. 11 is a flowchart of an example method of operation of a message content management application on a cloud server, in accordance with an embodiment. The method of operation begins, and in operation block 1101 the client-side application such as mobile application 1050, communicates with a native application executing on a computing device such as sender device 100 to obtain and store a multi-media content file generated using the native application in a native content file format. For example, the mobile application 1050 may communicate with native applications such as, but not limited to, email application 1032, messaging application 1033, camera application 1036, or some other native application etc. The native applications are referred to as "native applications" in that they are related to the operating system 1041 such as, but not limited to, Android™, iOS™, Ubuntu™, Windows, Linux, or some other operating system etc. of the sender device 100.

In operation block 1103, the server-side application such as the message content management service application provided by the message content management service application server 123, communicates with the client-side application, and creates an association between the multi-media content file generated by the naïve application, a recipient computing device, and a courier tracking number. The recipient computing device information may be, for example, a phone number of recipient device 105, an email address, a social media identifier or some other identifier, etc. The courier tracking number may be provided by the sender device 100 user inputting it into the GUI 101 or may be obtained by the mobile application 1050 by detecting keywords in email and/or messages such as SMS/MMS messages to determine relationship to a courier shipment and automatically obtain the courier tracking number.

In operation block 1105, the message content management service application on the cloud server 120 determines that delivery of a parcel associated with the courier tracking number has occurred. This may be accomplished by either communicating with a courier server or via the shipment tracking service 111. In operation block 1107, the cloud server 120 either transmits the multi-media content file in the native content file format directly to the recipient device in response to determining that delivery of the parcel has occurred, or controls the native application on the sender device 101 via the mobile application 1050 such that the native application such as, but not limited to, email, SMS/MMS, or some other native application sends the content to the recipient device 105.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A cloud server computer system comprising:
   a message content management service application server comprising at least one hardware processor, operative to:
   communicate with a plurality of on-demand delivery service servers to obtain information related to a plurality of deliveries;
   provide an instance of a message content management service application to a client device via a web browser executed on the client device;
   receive a first portion of delivery data from the instance of the message content management service application for a scheduled delivery;
   receive a second portion of the delivery data from an on-demand delivery service server, by using the first portion of the delivery data to identify an on-demand delivery service associated with the on-demand delivery service server, and to identify the second portion of the delivery data;
   obtain, via the instance of the message content management service application, a user generated multi-media content file generated by a content creation application executed on the client device, the user generated multi-media content file associated with the first portion of delivery data via user input received via the instance of the message content management service application;
   determine that the scheduled delivery has occurred using at least the first portion of delivery data, by communicating with the on-demand delivery service server; and
   transmit the user generated multi-media content file, to a recipient device of a recipient of the scheduled delivery, in response to determining that the scheduled delivery has occurred, wherein the recipient device is capable of using the user generated multi-media content file independently without interaction between the recipient device and the message content management service application server.

2. The cloud server computer system of claim 1, wherein the message content management service application server is further operative to:
   transmit the user generated multi-media content file to the recipient device at a location specified for the scheduled delivery within the second portion of delivery data, in response to determining that the scheduled delivery has occurred.

3. The cloud server computer system of claim 1, wherein the message content management service application server is further operative to:
   receive the first portion of delivery data from the instance of a message content management service application comprising recipient contact information, and the user generated multi-media content file.

4. The cloud server computer system of claim 1, wherein the message content management service application server is further operative to:
   receive the first portion of delivery data from the instance of a message content management service application comprising recipient location coordinates.

5. The cloud server computer system of claim 1, wherein the message content management service application server is further operative to:

determine that the scheduled delivery has occurred using the second portion of delivery data comprising location coordinates of a delivery agent delivering the scheduled delivery.

6. The cloud server computer system of claim 1, wherein the message content management service application server is further operative to:

create an association between the user generated multi-media content file, the client device, a recipient device, and a tracking number provided by the on-demand delivery service server.

7. The cloud server computer system of claim 1, wherein the message content management service application server is further operative to:

provide a graphical user interface (GUI) for display on the client device, the GUI corresponding to the instance of the message content management service application.

8. The cloud server computer system of claim 1, wherein the message content management service application server is further operative to:

provide a link to the recipient device to access the user generated multi-media content file on a social media server.

9. The cloud server computer system of claim 1, wherein message content management service application server is further operative to:

access a social media server to transmit the user generated multi-media content file to the recipient device via a social media platform.

10. A method of operating a message content management service application server comprising:

communicating with a plurality of on-demand delivery service servers to obtain information related to a plurality of deliveries;

providing an instance of a message content management service application to a client device via a web browser executed on the client device;

receiving a first portion of delivery data from the instance of the message content management service application for a scheduled delivery;

receiving a second portion of the delivery data from an on-demand delivery service server, by using the first portion of the delivery data to identify an on-demand delivery service associated with the on-demand delivery service server, and to identify the second portion of the delivery data;

obtaining, via the instance of the message content management service application, a user generated multi-media content file generated by a content creation application executed on the client device, the user generated multi-media content file associated with the first portion of delivery data via user input received via the instance of the message content management service application;

determining that the scheduled delivery has occurred using at least the first portion of delivery data, by communicating with the on-demand delivery service server; and transmitting the user generated multi-media content file, to a recipient device of a recipient of the scheduled delivery, in response to determining that the scheduled delivery has occurred, wherein the recipient device is capable of using the user generated multi-media content file independently without interaction between the recipient device and the message content management service application server.

11. The method of claim 10, further comprising:

transmitting the user generated multi-media content file to the recipient device at a location specified for the scheduled delivery within the second portion of delivery data, in response to determining that the scheduled delivery has occurred.

12. The method of claim 10, further comprising:

receiving the first portion of delivery data from the instance of a message content management service application comprising recipient contact information, and the user generated multi-media content file.

13. The method of claim 10, further comprising:

receiving the first portion of delivery data from the instance of a message content management service application comprising recipient location coordinates.

14. The method of claim 10, further comprising:

determining that the scheduled delivery has occurred using the second portion of delivery data comprising location coordinates of a delivery agent delivering the scheduled delivery.

15. The method of claim 10, further comprising:

creating an association between the user generated multi-media content file, the client device, a recipient device, and a tracking number provided by on-demand delivery service server.

16. The method of claim 10, further comprising:

providing a graphical user interface (GUI) for display on the client device, the GUI corresponding to the instance of the message content management service application.

17. A non-transitory, non-volatile computer readable memory comprising:

executable instructions for execution by at least one processor, that when executed cause the at least one processor to:

communicate with a plurality of on-demand delivery service servers to obtain information related to a plurality of deliveries;

provide an instance of a message content management service application to a client device via a web browser executed on the client device;

receive a first portion of delivery data from the instance of the message content management service application for a scheduled delivery;

receive a second portion of the delivery data from an on-demand delivery service server, by using the first portion of the delivery data to identify an on-demand delivery service associated with the on-demand delivery service server, and to identify the second portion of the delivery data;

obtain, via the instance of the message content management service application, a user generated multi-media content file generated by a content creation application executed on the client device, the user generated multi-media content file associated with the first portion of delivery data via user input received via the instance of the message content management service application;

determine that the scheduled delivery has occurred using at least the first portion of delivery data, by communicating with the on-demand delivery service server; and transmit the user generated multi-media content file, to a recipient device of a recipient of the scheduled delivery, in response to determining that the scheduled delivery has occurred, wherein the recipient device is capable of using the user generated multimedia content file independently without interaction between the recipient device and the message content management service application server.

18. The non-transitory, non-volatile computer readable memory of claim 17, wherein the executable instructions when executed, cause the at least one processor to:

transmit the user generated multi-media content file to the recipient device at a location specified for the scheduled delivery within the second portion of delivery data, in response to determining that the scheduled delivery has occurred.

19. The non-transitory, non-volatile computer readable memory of claim 17, wherein the executable instructions when executed, cause the at least one processor to:

receive the first portion of delivery data from the instance of a message content management service application comprising recipient contact information, and the user generated multi-media content file.

20. The non-transitory, non-volatile computer readable memory of claim 17, wherein the executable instructions when executed, cause the at least one processor to:

receive the first portion of delivery data from the instance of a message content management service application comprising recipient location coordinates.

*     *     *     *     *